United States Patent [19]

Schiel et al.

[11] Patent Number: 4,919,761
[45] Date of Patent: Apr. 24, 1990

[54] LONG NIP PRESS ROLL WITH INTERNAL LINE COUPLINGS AT BOTH AXIAL ROLL ENDS

[75] Inventors: Christian Schiel; Hans Flämig, both of Heidenheim; Andreas Schütte, Steinheim, all of Fed. Rep. of Germany

[73] Assignee: J. M. Voith GmbH, Fed. Rep. of Germany

[21] Appl. No.: 411,407

[22] Filed: Sep. 22, 1989

[30] Foreign Application Priority Data

Sep. 23, 1988 [DE] Fed. Rep. of Germany ....... 3832324

[51] Int. Cl.⁵ ................................................ D21F 3/08
[52] U.S. Cl. ..................................... 162/358; 29/113.1; 29/113.2; 29/116.2; 100/93 RP; 100/153; 162/272; 162/361
[58] Field of Search ................. 29/113.1, 113.2, 116.1, 29/116.2; 162/358, 272, 361; 100/93 RP, 170, 118, 153, 154

[56] References Cited

U.S. PATENT DOCUMENTS 4,222,324 9/1980 Biondetti ............................ 29/113.2
4,555,305 11/1985 Steiner et al. ........................ 162/358
4,584,059 4/1986 Schiel et al. ........................ 29/113.2
4,625,637 12/1986 Pav et al. ............................ 29/116.2
4,707,222 11/1987 Mullner et al. ...................... 162/358

Primary Examiner—Karen M. Hastings
Attorney, Agent, or Firm—Ostrolenk, Faber, Gerb & Soffen

[57] ABSTRACT

A long nip press roll includes a stationary support member and a flexible, tubular, inflatable press shell which is supported to rotate around the support member by axially separated support discs rotatable around the support member. A radially displaceable press shoe is supported on the support member for pressing outward against the press shell against a counter roll in the press plane. To enable the press roll to be used in a press where it is disposed either beneath or above the counter roll, all of the internal lines in the support member, e.g. those for the supply and discharge of pressure oil, lubricant and cooling oil and press shell pressurizing air, include two sets of coupling for coupling them to external lines, a respective set of the couplings being located at each axial end of the press roll. During assembly, one of the sets of couplings at one end is connected to external lines, and the other set of couplings is closed.

11 Claims, 3 Drawing Sheets

LONG NIP PRESS ROLL WITH INTERNAL LINE COUPLINGS AT BOTH AXIAL ROLL ENDS

BACKGROUND OF THE INVENTION

The present invention relates to long nip press roll for the press section of a paper making machine or the like machine, and particularly relates to the fluid supply and withdrawal lines to that press roll.

Long nip press rolls may have a number of elements. Each includes a stationary support member. A flexible, tubular inflatable press shell of the press roll is guided on a path which is at least approximately circular by means of two axially spaced apart, circular, supporting discs that are rotatably mounted on and surround the support member. A press shoe is disposed on the support member within the press shell. The press shoe can be radially displaced parallel to the press plane of the press roll against a counter roll. An areal press nip is formed between the press shell and the counter roll. Through that nip, a web to be treated can pass, preferably together with at least one felt belt. The press roll also has internal lines or conduits for the supply and discharge of pressure oil, lubricating and/or cooling oil, compressed air, or the like. These internal lines have a set of corresponding couplings for coupling the internal lines to external lines located at one end of the press roll.

Long nip rolls of this type are successfully used in the press sections of paper making machines. The areal press nip is extended in the direction of travel and is formed together with a counter roll. Substantially greater drainage efficiency is obtained with long nip press rolls than with normal press rolls.

The long nip press rolls has a flexible, tubular press shell which is guided at its ends on an approximately circular path by means of two supporting discs which are rotatably mounted on a stationary support member. The support member is normally I-shaped and extends through the interior of the press shell. The support member is provided with an axially extending, radially displaceable press shoe at one angular location around its periphery, which shoe is to be pressed against the counter roll. The press shoe is normally located in an axially extending pressure chamber which is defined in the support member, and the shoe is operated to move radially by hydraulic pressure in the pressure chamber.

Such a long nip press roll is known from German Patent Specification No.33 11 966, which is equivalent to U.S. Pat. No. 4,555,305. See also German patent application Ser. No. P 37 08 189.6, which corresponds to pending U.S. application Ser. No. 164,542.

The cross-sectional view as in FIG. 1 of the present disclosure shows that the whole long nip press roll arrangement is a symmetrical. On one hand, the support member, the hydraulic pressure chamber and the lower part of the press shoe are disposed symmetrically with respect to the press plane. On the other hand, the common axis of rotation of the press shell and of the two supporting discs for the press shell is offset by a certain lateral radial distance from the press plane. Auxiliary assembly strips, which guide installation in the axial direction of the press shell over the support member, and a suction duct for a lubricating and cooling fluid are also laterally offset. Furthermore, the upper or radially outer part of the two part press shoe is constructed asymmetrically with respect to the press plane. The web inlet or upstream side of the press shoe has a curved extension so that the center of the upper part of the press shoe is offset by a certain distance from the press plane.

German Utility Model No.87 17 279, equivalent to International Application WO No.88/08051, shows examples of machines using such long nip press rolls. Thus, that patent application discloses a machine for the manufacture of fibrous webs, preferably webs of paper, having a Fourdrinier wire section and having a press section which has two long nip press rolls which are alternately arranged. Directly to the Fourdrinier wire section there is connected a first one of the long nip presses with its counter roll at the bottom below the long nip press roll. In the position of the second of the presses, the counter roll is located above the long nip press roll. By this type of arrangement, the main drainage from the web is directed downward in the first press and upward in the second press, which results in greater overall drainage, and the two sidedness of the paper web is reduced.

For a paper machine, a long nip press roll included in the press section represents a relatively sensitive and consequently cost intensive component. A certain degree of wear is expected, which can make it necessary to replace an entire long nip press roll or to exchange individual operating parts. Therefore, it is necessary for the paper making machine user to keep a spare long nip press roll in stock.

Because of the described asymmetry of a long nip press roll and because of the sometimes presence of two long nip press rolls in different positions in one machine installation, wherein each long nip press roll has a respective different direction of rotation according to German Utility Model No. 87 17 279, it is necessary to have a spare long nip press roll in stock for each of the installed long nip press rolls, i.e. a total of two different long nip press rolls.

SUMMARY OF THE INVENTION

It is an object of the present invention to provide a long nip press roll of the above type which is able to be installed inside a press section both in the upper and in the lower positions, so that only a single spare long nip press roll need be kept in stock. In particular, it is the object of the invention to enable a long nip press roll to have external fluid supply lines coupled to either of its ends, which is a preferred way to achieve the first mentioned object.

In accordance with the invention, all of the couplings at the internal supply and discharge lines or conduits or pipes for pressure oil, lubricant and cooling oil, compressed air and for control, which internal lines may be located in the support member, and which couplings are required to produce a connection to the external supply and discharge lines to the roll are provided in two complete sets of couplings each located at a respective end of the long nip press roll. Thus, during assembly of the long nip press roll in one or the other presses or in a particular machine installation, one or the other of the two sets of couplings is connected to the external lines, depending upon the position of the roll with respect to its counter roll.

For this purpose, the internal lines may either be arranged inside the long nip press roll so that they extend continuously from one end to the other end along the support member, or certain ones of the lines may be provided twice, first in the one end of the press roll and secondly in the other end.

A long nip press roll according to the invention may now be optionally inserted into the first press or into the second press, for example in a paper machine according to German Utility Model No. 87 17 279. If the long nip press roll at first lies, for example, in the position of the first press and it is to be brought into the position of the second press, then it only needs to be reversed so that:

(1) the end of the long nip press roll, which was previously on the drive side of the paper machine, is now at the front side, and the end of the long nip press roll, which was previously on the front side, is now at the drive side, and (2) the press shoe, which was previously at the bottom, is reoriented into the upper position.

The arrangement according to the invention may also require couplings to be located at both ends for the mounting of an assembly connection. This attachable assembly connection is required for receiving a hoisting device that is used when replacing the press shell, which replacement preferably occurs inside the paper machine.

To facilitate the assembly of a new press shell in each installation position, in a further refinement of the invention, auxiliary assembly strips, associated with the stationary support member are also provided in the lower region. These are normally only provided for the upper region of the circular path. The additional auxiliary strips fit the press roll for use in either of the mutually inverted above or below positions.

If lubricant and cooling oil discharge lines are required, they can be arranged in such a way that they have two diametrically opposite suction apertures or two groups of suction apertures. This guarantees that the lubricant and cooling fluid obtained can be drained off in either installation position above or below.

Other features and advantages of the present invention will become apparent from the following description of the invention which refers to the accompanying drawings.

DETAILED DESCRIPTION OF THE PREFERRED EMBODIMENT

Figure 1:
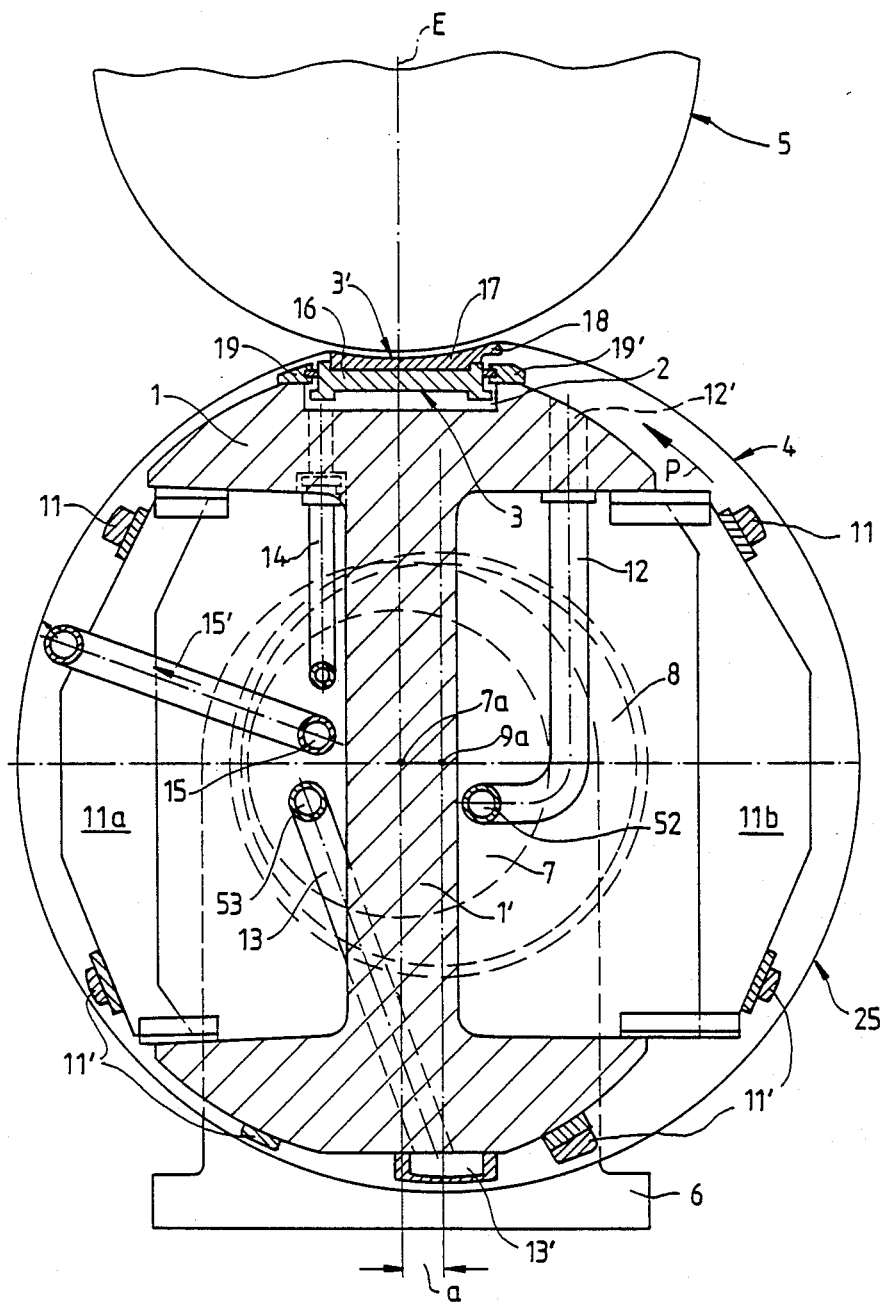
FIG. 1 is a cross section through a long nip press roll adapted with the invention.

FIG. 1 shows the vertical press plane E of a long nip press roll, which is shown in cross section. A stationary support member 1 is of I-shaped cross section with convexly curved radially outer profiles on the top and bottom cross parts. The vertical strut 1' of the support member 1 is placed symmetrically with respect to the press plane E. One of the curved outer profiles of member 1 is provided with an axially extending recess 2, which is also symmetrical with respect to the press plane. That recess forms a hydraulic pressure chamber of an axially extending press shoe 3 located in it.

Transverse forces are avoided by the support member 1, the pressure chamber 2 and the counter roll 5, which opposes the radial exterior of the press shoe, being symmetrically disposed with respect to the press plane E.

Around the support member 1 and the press shoe 3 runs a flexible material, tubular press shell 4. The axial ends of that tubular shell are directly attached to supporting discs 9, so that the interior of the shell can be pressurized with compressed air which slightly inflates the shell, stiffens it and makes it round, like its support discs 9, described below. By supplying a pressure medium under pressure into the hydraulic pressure chamber 2, the press shoe 3 therein can be forced radially outwardly against the inside of the press shell 4. This ensures that the press shell 3 is pressed against the counter roll 5, which is shown diagrammatically in FIG. 1.

A bearing pedestal 6 is provided at each end of the press roll, and each pedestal is also disposed symmetrically to press plane E. Support member 1 is supported between the pedestals by centrally disposed journals 7. The central axis of the roll is at 7a.

On each of the two journals 7 is disposed a respective eccentric bearing element 8. On each of those elements 8 is rotatably mounted a supporting disc 9 for the press shell 4. The mutual axis of rotation 9a for the press shell 4 and the two supporting discs 9 is thereby offset from the press plane E by radial, lateral distance "a".

Also offset in the same way are auxiliary assembly strips or rails 11 and 11', which extend parallel to the axis 7a of the support member 1. The press shell 4 slides along these strips when it is fitted onto the support member during assembly. These strips are disposed partly in the upper region and partly in the lower region of the circular path of the shell. The upper auxiliary strips are disposed on the support member generally above the approximate horizontal center of the support member, while the lower auxiliary strips are disposed generally below the approximate horizontal center of the support member. Thus, there are strips to support the press shell as it is drawn axially over one disc and over the support member as the shell is being installed. The strips at the upper and lower region provide support whether the press roll is above or below the counter roll. The rails 11, 11' are attached to struts 11a and 11b, which are provided for this purpose, or they are attached directly to support member 1.

Various passages, lines and conduits are described below. They are internal to the press roll and are inside the support member, communicating out of it, as required.

As extraction or suction aperture 13' for the constant flow of lubricant or cooling fluid is also disposed eccentrically on the curved profile at the bottom of the support member 1. A second extraction aperture 12', which is connected to an outlet or discharge line 12, is provided diametrically opposite on the curved profile at the top of the support member. The aperture 12' is positioned, with respect to the direction of rotation of the press shell (arrow P), in front of the inlet side of the press shoe 3. Providing apertures at both sides enables extraction regardless of whether the press roll is above or below the counter roll.

There is a supply line for pressure oil 14, which opens into the hydraulic pressure chamber 2. A supply line 15' for lubricant and cooling fluid has outlet apertures arranged to direct fluid onto the inside of press shell 4 and is positioned, with respect to the direction of rotation of the press shell (arrow P), a short distance following or downstream of the press shoe 3.

The press shoe 3 is constructed in two parts. The lower radially inner part 16 is arranged substantially symmetrically to the press plane E and functions as a piston. The upper radially outer part 17 has an outer sliding surface 3' over which the press shell passes. The upper part is, however, disposed asymmetrically to the press plane because it includes an extension 18 which is provided on the upstream or inlet side. Packing strips 19' having sealing strips 19 are provided to contact and guide the press shoe 3 and to seal the pressure chamber 2.

Figure 2:
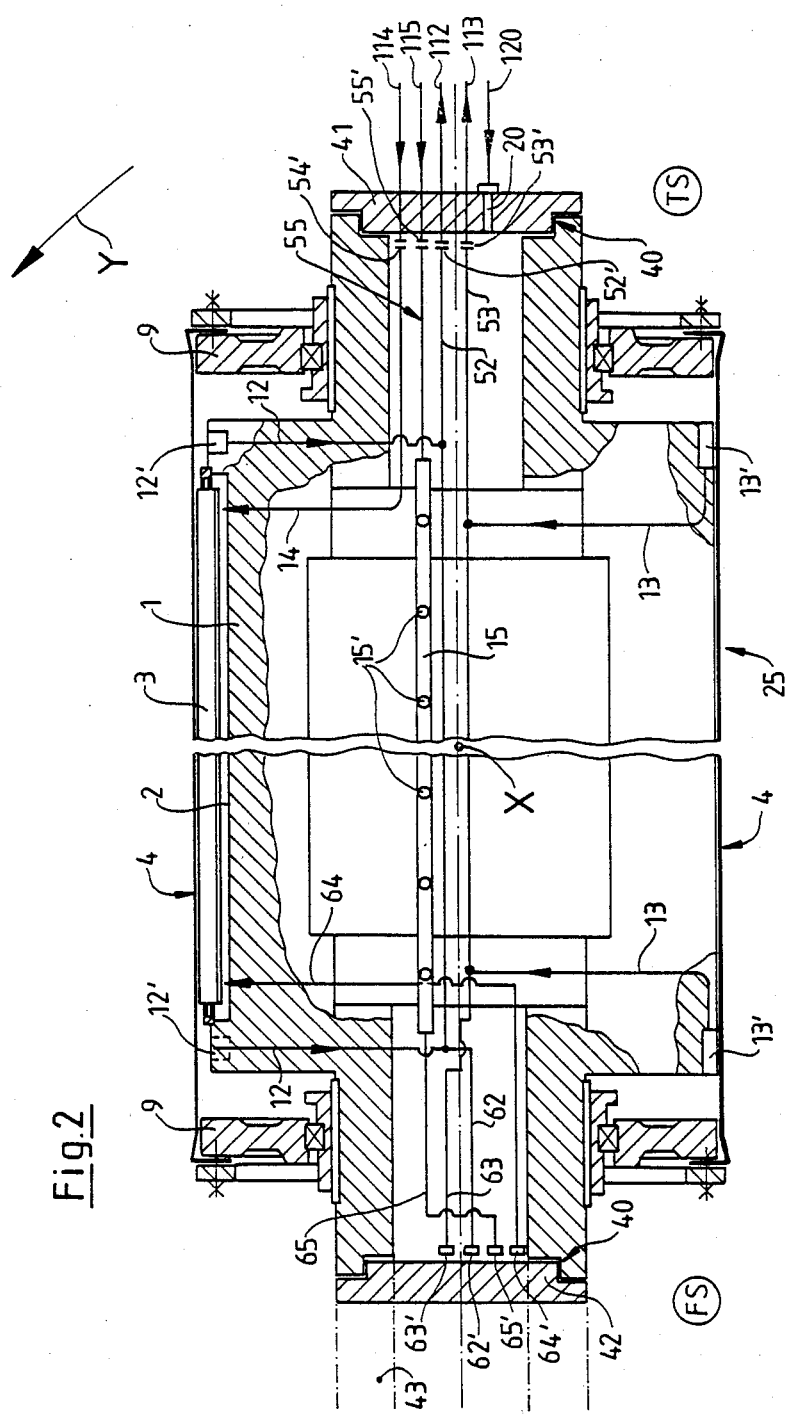
FIG. 2 is a diagrammatic longitudinal section through the long nip press roll.
Figure 3:
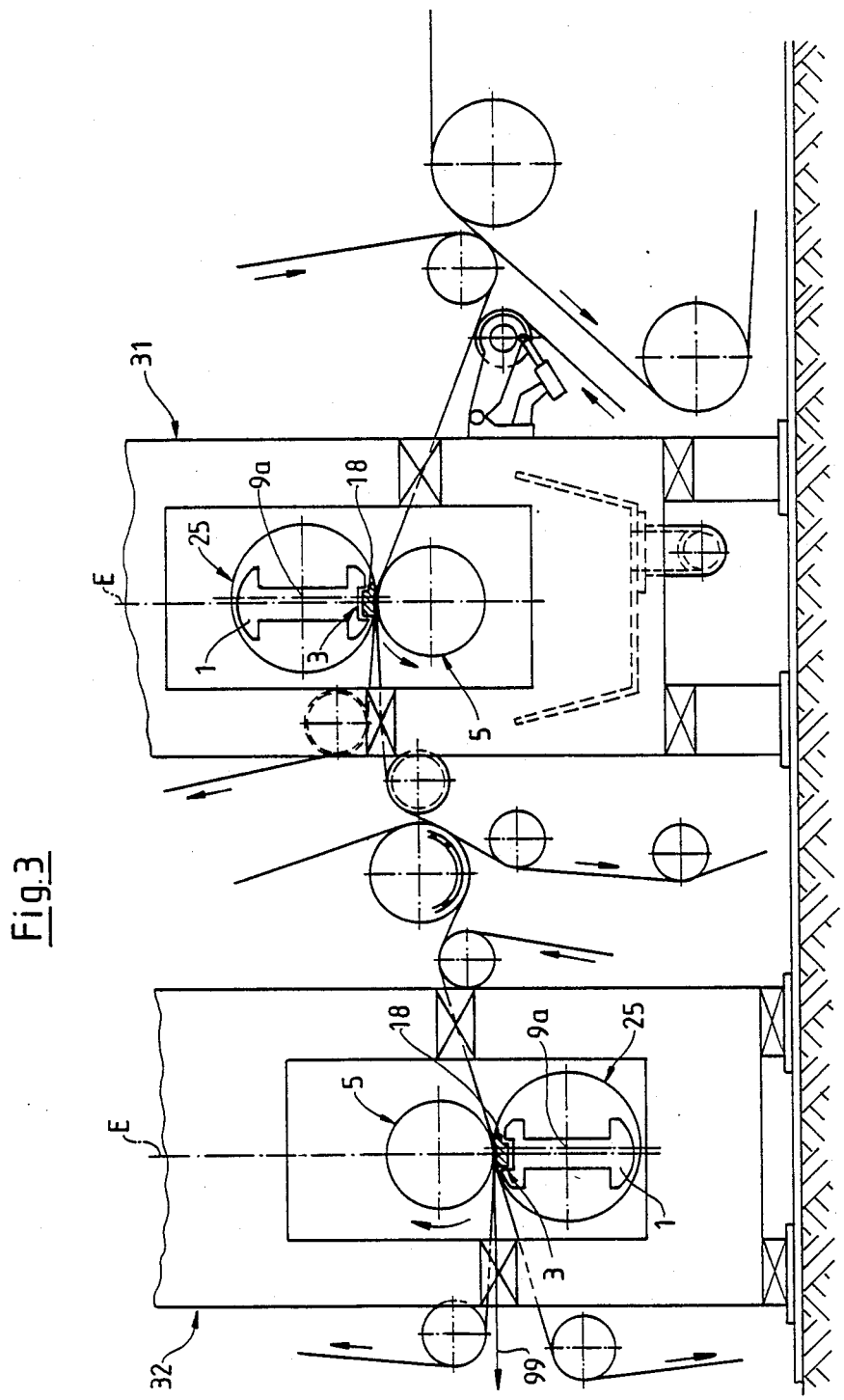
FIG. 3 is a diagrammatic sectional view of a machine for the production of fibrous webs, with a Fourdrinier wire section and a press section.

In the longitudinal section of the roll, shown diagrammatically in FIG. 2, the press direction of the press shoe is upwards. In FIG. 3, this corresponds to the press shoe of the long nip press roll 25 in the second press 32. If the press shoe 3 is at the top (see FIG. 3, press 32), the internal lines 14, 52, 53 and 55 in the press roll are connected on the drive side end (TS) to external lines 114, 112, 113 and 115, respectively, leading away from the press roll.

The supply line for pressure oil 14 leads into the hydraulic pressure chamber 2, so that the press shoe 3 can be forced by the supplied pressusre oil against the interior of the press shell 4.

To cool the press shell 4 and to lubricate the sliding surface 3' of press shoe 3, over which the internal surface of the press shell 4 runs, cooled oil is supplied via the main line 15 and travels onto the inside of the press shell via several radially extending connection pipes 15' arrayed across the press shell.

FIG. 2 also shows the extraction apertures 12' and 13' disposed opposite one another at the periphery of the press shell.

After it has rotated as far as possible along with the press shell 4, the lubricant and cooling fluid or oil is discharged or removed before entering the press zone via extraction aperture 12' and internal discharge lines 12 and 52. The lubricant and cooling fluid is almost exclusively discharged via the extraction aperture 12', irrespective of whether the long nip press roll is disposed above the counter roll 5 (FIg. 3, first press 31), or is disposed beneath the counter roll 5, as in the second press 32.

In the lower arrangement of the long nip press roll (FIG. 3, second press 32), the coupling to the external line 112 is made via internal discharge lines 12 and 52. In the upper arrangement of the long nip press roll (FIG. 3, first press 31) the coupling to the external line 112 is instead made via the internal discharge line 62.

In addition, lubricant and cooling fluid may also be discharged via extraction aperture 13', which is disposed axially with respect to the circular path of the press shell. This occurs mainly when the long nip press roll 25 is disposed beneath the counter roll 5 (FIG. 3, second press 32) and the long nip press roll is stopped. In this case, the lubricant and cooling fluid reaches external discharge line 113, which is brought up to the drive side end (TS) via extraction aperture 13' and internal discharge lines 13 and 53.

Pressure is supplied to the inside of the press shell via a compressed air supply line 120 so as to inflate the shell and ensure smooth rotation of the press shell 4 around its circular path during operation without the shell touching the auxiliary assembly strips 11 and 11'.

At its drive side end (TS) the long nip press roll is closed by a cover 41, which can be precisely inserted into a centering seat 40 provided for the cover at the end of the roll. This cover has all of the apertures for the various supply and discharge lines and also has a further coupling aperture 20 for the supply of compressed air. In this case, the opposite front side end (FS) of the press roll has a centering seat 40 which is identical to the seat on the drive side end (TS), but the seat on the front side is closed by a fitted blank flange 42. This flange 42 can be removed and replaced by an assembly connection 43, which is necessary for mounting a shell hoisting device used during replacement of a press shell.

Depending upon whether the long nip press roll 25 is disposed in the first press 31 or the second press 32 (see FIG. 3), the cover 41 on the drive side end and the blank flange 42 or the assembly connection 43 on the front side end have to be exchanged. In other respects, the two long nip press rolls 25 in FIG. 3 are identical. It is noted that in both long nip press rolls 25, the axis of rotation 9a of the press shell 4 is displaced contrary to the direction of travel of the paper web 99 from the press plane E and the extension 18 of the press shoe 3 is located at its inlet side.

According to the invention, the foregoing is made possible by groups of measures.

At each roll end there is a line 14 or 64 respectively opening into the pressure chamber 2 beneath the press shoe 3.

All other internal supply and discharge lines 12, 13 and 15 extend over the entire length of the long nip press roll 25 and are brought right up to both ends of the long nip press roll. See FIG. 2 and its internal lines 52/62, 53/63 and 55/65).

Both ends also have cooouplings, e.g. coupling flanges 52' to 55', and 62' to 64', for external lines 112, 113, 114 and 115.

If the long nip press roll 25 is installed in the second press 32 (see FIG. 3) then this corresponds to the representation in FIG. 2. In this arrangement, internal lines 12, 13, 14 and 15 are connected to external lines 112, 113, 114 and 115 via couplings 52', 53', 54' and 55'. Couplings 62', 63 ', 64' and 65', which are on the front side end in this press 32, are closed, as shown in FIG. 2.

If the long nip press roll 25 is instead disposed in the first press 31 (see FIG. 3), couplings 62', 63', 64' and 65' are located on the drive side of the paper making machine, and they are coupled to external lines 112, 113, 114 and 115, whereas couplings 52' to 55' are then closed.

This arrangement has the following line connections: 62 to 112, 63 to 113, 64 to 114 and 65 to 115. If a long nip press roll 25 is brought from the "second press 32" position (shown in FIG. 2) into the "first press 31" position (see FIG. 3), it must at least theoretically be swung by 180° around an imaginary axis X which is perpendicular to the plane of the drawing of FIG. 2, for instance in the direction indicated by the arrow Y.

The centering seats 40 provided at both ends of the long nip press roll are identical in construction. Accordingly, the couplings to their seats of both of the cover 41 and of the blank flange 42 and also of the assembly connection 43 are identical. Therefore, each of the three parts 41, 42, 43 may be connected either to the one press roll end or to the other, depending upon which press 31 or 32 is being assembled.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A long nip press roll comprising:
a stationary support member; two axially spaced apart supporting discs mounted for rotation on the support member;
a press shoe disposed on and supported on the support member, and means in the support member for displacing the press shoe radially parallel to the press plane of the press roll and against another counter roll;
a flexible, tubular, inflatable press shell extending around the support member, affixed to the supporting discs and extending around the press shoe for forming an areal press nip between the exterior of the press shell at the press shoe and the counter roll in the press plane for treating a web to be passed through the nip;
the press roll having opposite axial ends; the press roll further having respective internal lines located between the axial ends of the roll for at least some of the supply and discharge of pressure oil, for lubricating and cooling oil, and for compressed air for pressurizing the press shell;
each internal line having one of a first set of corresponding couplings for receiving a respective external line located outside one axial end of the press roll, the first set of couplings being located at one axial end of the press roll; each internal line having one of a second set of corresponding couplings for receiving a respective external line located outside the other axial end of the press roll, the second set of couplings being located at the other axial end of the press roll, the couplings providing connections from the internal lines to the respective external lines.

2. The long nip pess roll of claim 1, wherein the supporting discs are rotatably mounted on and surround the support member where the discs are located around the support member.

3. The long nip press roll of claim 1, and further comprising a plurality of external lines, external to the press roll and connected to respective ones of a selected one of the sets of couplings for the internal lines.

4. The long nip press roll of claim 3, wherein the other set of couplings, which is not connected to the external lines, are closed off.

5. The long nip press roll of claim 1, wherein the internal lines are defined in the support member.

6. The long nip press roll of claim 1, wherein the support member has an axial recess therein at the press shoe and the press shoe extends axially along the support member and is disposed in the recess therefore in the support member;
the internal line for pressure oil extending to the recess in the support member.

7. The long nip press roll of claim 1, wherein the internal lines for the supply and discharge of lubricating and cooling oil extend through the support member and radially to the outside of the support member inside the press shell.

8. The long nip press roll of claim 1, further comprising an assembly coupling at at least one end of the press roll for receiving an assembly device.

9. The long nip press roll of claim 8, further comprising a second assembly coupling for receiving an assembly device and located at the other end of the press roll.

10. The press roll of claim 1, further comprising auxiliary assembly strips disposed on the support member at locations around the periphery of the support member at the upper part thereof generally above the approximate horizontal center and at the lower part thereof generally below the approximate horizontal center of the support member for providing support to the press shell as it is slid axially onto the support member over the assembly strips.

11. The long nip press roll of claim 1, wherein the internal lubricating and cooling oil supply and discharge lines have diametrically opposite outlet apertures at the periphery of the press shell.

* * * * *